(12) United States Patent
Barde et al.

(10) Patent No.: US 7,149,809 B2
(45) Date of Patent: Dec. 12, 2006

(54) SYSTEM FOR REDUCING SERVER LOADING DURING CONTENT DELIVERY

(75) Inventors: Kaushik Barde, Sunnyvale, CA (US); Richard Hartman, Santa Clara, CA (US); Gopinath Rebala, Sunnyvale, CA (US)

(73) Assignee: One Touch Systems, San Jose, CA (US)

( * ) Notice: Subject to any disclaimer, the term of this patent is extended or adjusted under 35 U.S.C. 154(b) by 744 days.

(21) Appl. No.: 10/010,507

(22) Filed: Nov. 13, 2001

(65) Prior Publication Data

US 2003/0093511 A1    May 15, 2003

(51) Int. Cl.
*G06F 15/16* (2006.01)
(52) U.S. Cl. .................. 709/231; 709/237; 709/248
(58) Field of Classification Search .............. 709/200, 709/223, 217, 201, 238, 231, 237, 248; 711/122; 713/201; 370/429
See application file for complete search history.

(56) References Cited

U.S. PATENT DOCUMENTS

| | | | | |
|---|---|---|---|---|
| 5,774,660 A * | 6/1998 | Brendel et al. | ............. | 709/201 |
| 5,935,207 A * | 8/1999 | Logue et al. | ............... | 709/219 |
| 5,991,306 A * | 11/1999 | Burns et al. | ................ | 370/429 |
| 6,098,093 A * | 8/2000 | Bayeh et al. | ............... | 709/203 |
| 6,298,373 B1 * | 10/2001 | Burns et al. | ................ | 709/203 |
| 6,324,182 B1 * | 11/2001 | Burns et al. | ................ | 370/429 |
| 6,351,467 B1 * | 2/2002 | Dillon | ........................ | 370/432 |
| 6,351,775 B1 * | 2/2002 | Yu | .............................. | 709/238 |
| 6,385,642 B1 * | 5/2002 | Chlan et al. | ................ | 709/203 |
| 6,389,462 B1 * | 5/2002 | Cohen et al. | ................ | 709/218 |
| 6,463,447 B1 * | 10/2002 | Marks et al. | ................ | 715/513 |
| 6,539,406 B1 * | 3/2003 | Ibarra et al. | ................ | 715/513 |
| 6,542,964 B1 * | 4/2003 | Scharber | ....................... | 711/122 |
| 6,606,708 B1 * | 8/2003 | Devine et al. | ............... | 713/201 |
| 6,658,463 B1 * | 12/2003 | Dillon et al. | ............... | 709/219 |
| 6,748,447 B1 * | 6/2004 | Basani et al. | ............... | 709/244 |
| 6,754,699 B1 * | 6/2004 | Swildens et al. | ........... | 709/217 |
| 6,886,013 B1 * | 4/2005 | Beranek | ....................... | 707/10 |
| 6,904,464 B1 * | 6/2005 | Van Langen et al. | ........ | 709/237 |
| 6,917,960 B1 * | 7/2005 | Decasper et al. | ........... | 709/203 |
| 6,957,229 B1 * | 10/2005 | Dyor | ....................... | 707/103 X |
| 6,978,306 B1 * | 12/2005 | Miller et al. | ................. | 709/226 |
| 6,983,324 B1 * | 1/2006 | Block et al. | ................. | 709/228 |
| 7,062,567 B1 * | 6/2006 | Benitez et al. | .............. | 709/231 |
| 7,080,153 B1 * | 7/2006 | Monteiro et al. | ........... | 709/231 |
| 2002/0010737 A1 * | 1/2002 | Garcia-Luna-Aceves et al. | ............... | 709/203 |
| 2002/0019828 A1 * | 2/2002 | Morti | ......................... | 707/200 |
| 2002/0073167 A1 * | 6/2002 | Powell et al. | ................ | 709/217 |
| 2002/0107934 A1 * | 8/2002 | Lowery et al. | ............. | 709/213 |
| 2002/0129159 A1 * | 9/2002 | Luby et al. | ................. | 709/236 |
| 2004/0049598 A1 * | 3/2004 | Tucker et al. | ................ | 709/246 |

* cited by examiner

*Primary Examiner*—Rupal Dharia
*Assistant Examiner*—Kristie D. Shingles
(74) *Attorney, Agent, or Firm*—Artz & Artz, P.C.

(57) ABSTRACT

A server load reduction system includes a master URL containing data. The system further includes a proxy browser, which conducts a browse operation to request the data contained in the master URL. This browse operation is conducted through a proxy server. The proxy server is capable of receiving the data from the master URL. The proxy server includes logic operative to record and distribute the data to a client server. Logic contained in the proxy browser is operative to notify a client server to load the data when the proxy server contains all of the data.

16 Claims, 2 Drawing Sheets

SYSTEM FOR REDUCING SERVER LOADING DURING CONTENT DELIVERY

TECHNICAL FIELD

The present invention relates generally to electronic multimedia exchange, and, more particularly, to reducing server load during content delivery.

BACKGROUND

The World Wide Web (WWW) is a system of Internet servers that support specially formatted documents. The documents are formatted in a script called HTML (HyperText Markup Language) that supports links to anything that is capable of being transmitted digitally over the Internet, such as documents, graphics, audio files, video files and the like. There are several applications called "web browsers" that simplify access to the WWW. Two notable examples are Netscape Navigator™ and Microsoft's Internet Explorer™.

For a transaction on the WWW between a client terminal and a host server, the client terminal retrieves a web object from the host server. The host server is identified through a Uniform Resource Locator (URL), which is the global address of documents and other resources on the WWW. The client terminal normally accesses the Internet through an Internet Access Service Provider (IASP). A cache, located within the IASP network, functions as an intermediary in transactions involving retrieval of objects from servers by a client terminal. The cache within the IASP saves a copy of a retrieved object for itself when the object is moved from the server to the requesting client terminal. This caching operation is transparent to the user and, under normal circumstances, does not result in substantial delay from the copying operation. The copying operation is performed simultaneously with the retrieval from the server and the delivery to the client terminal.

The cache within the IASP network satisfies subsequent requests for objects that are stored therein, thereby obviating the necessity of retrieving the object from the original server. This reduces the delay as perceived by the user to access the object and saves bandwidth on links that connect the IASP network to the Internet. HTTP is the underlying protocol used by the World Wide Web. HTTP defines how messages are formatted and transmitted and what actions web servers and browsers should take in response to various commands. Direct browsing by multiple clients to a particular site using HTTP tends to result in overloading of the host.

A further problem currently exists with satisfying subsequent requests for an object from the cache. The copy of the object stored in the cache may differ from the object in the server if the latter is modified after the initial request for the object. When this occurs, the copy of the object provided to the requesting client from the cache may not be current.

The disadvantages associated with current, server download techniques have made it apparent that a new technique for downloading objects is needed. Given a host server web page, the new technique should allow multiple clients to rapidly and efficiently download the entire page. The new technique should also update cached information to minimize outdated information transfers. The present invention is directed to these ends.

SUMMARY OF THE INVENTION

It is an object of the present invention to provide a system for allowing multiple clients to rapidly and efficiently download entire web pages. It is another object of the present invention to update cached information to minimize outdated information transfers.

In accordance with the present invention, a server load reduction system is disclosed. The server load reduction system includes a master URL containing data. The system further includes a proxy browser, which conducts a browse operation to request the data contained in the master URL. This browse operation is conducted through a proxy server. The proxy server is capable of receiving the data from the master URL. The proxy server includes logic operative to record and distribute the data to a client server. Logic contained in the proxy browser is operative to notify a client server to load the data when the proxy server contains all of the data.

Additional advantages and features of the present invention will become apparent from the description that follows and may be realized by the instrumentalities and combinations particularly pointed out in the appended claims, taken in conjunction with the accompanying drawings.

BRIEF DESCRIPTION OF THE DRAWINGS

For a more complete understanding of the invention, there will now be described some embodiments thereof, given by way of example, reference being made to the accompanying drawings, in which.

DETAILED DESCRIPTION OF THE PREFERRED EMBODIMENT

The present invention is illustrated with respect to a server load reduction system, particularly suited to electronic multimedia transfer and storage. However, the present invention is applicable to various other uses that may require reduction of server loads, as will be understood by persons skilled in the art.

Figure 1:
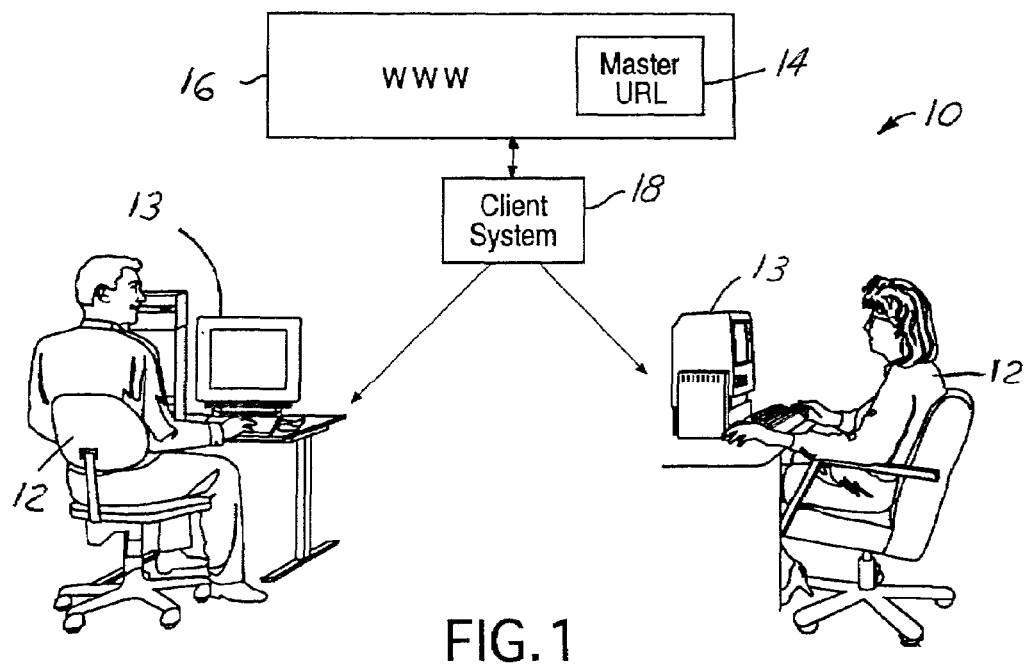
FIG. 1 is a perspective view of a server load reduction system in accordance with an embodiment of the present invention.

Referring to FIG. 1, a perspective view of a server load reduction system 10, in accordance with one embodiment of the present invention, is illustrated. The system 10 includes a group of users 12 from the same client operating a group of user terminals 13 and downloading the same master URL 14 from the WWW 16, as will be understood by one skilled in the art. The current invention is browser type independent. In other words, one of the users may run Netscape Navigator™ while another runs Internet Explorer™. After the client group of users 12 requests the master URL 14 through the group of user terminals 13, the client system 18 activates and downloads the data from the master URL 14 for storage and use in the group of user terminals 13, as will be discussed later.

Figure 2:
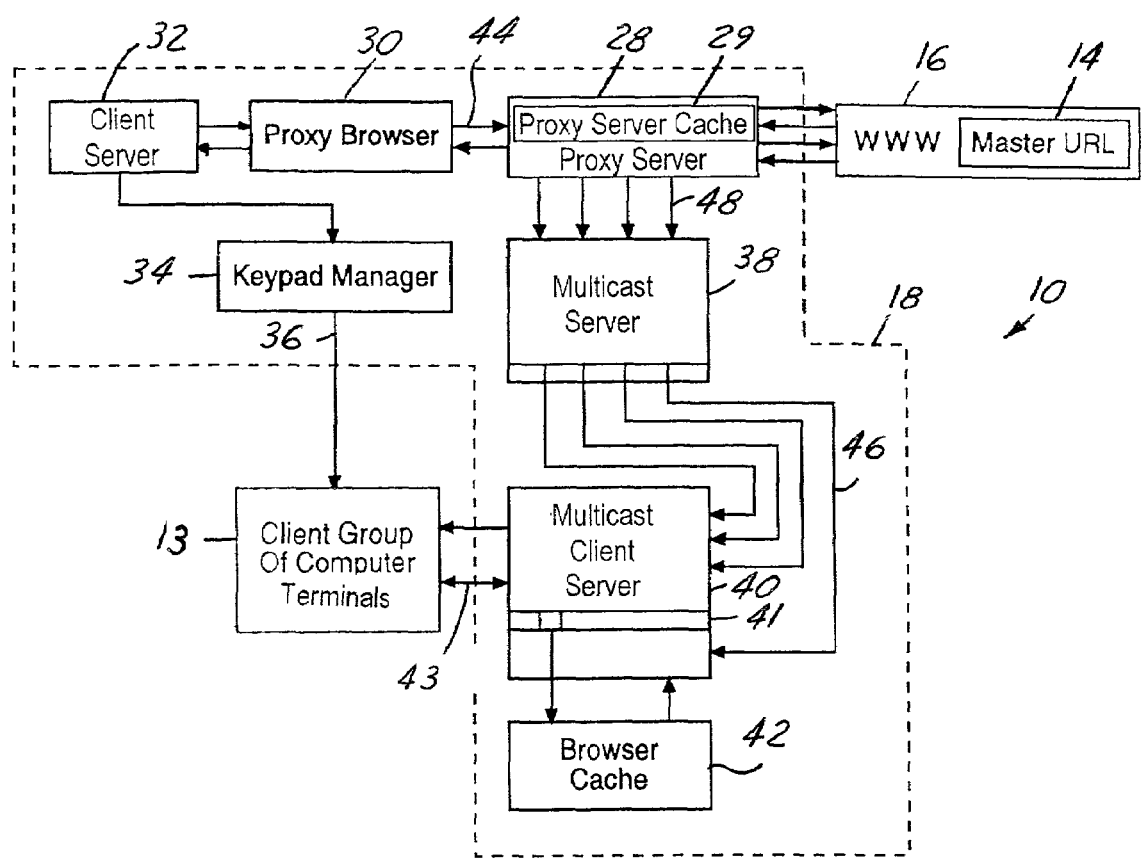
FIG. 2 is a schematic diagram of a server load reduction system in accordance with an embodiment of the present invention.

Referring to FIG. 2, a schematic diagram of a server load reduction system 10, in accordance with one embodiment of the present invention, is illustrated. The load reduction system 10 includes a master Uniform Resource Locator (URL) 14. The URL is the global address of a set of documents and other resources on the WWW 16. When a group of computer users 12 for a specific client browse to a particular HTTP site, that site is subjected to large amounts of loading proportional to the number of clients attempting access. For the current embodiment, one client downloads the entire master URL 14 and then accesses the client proxy server 28 rather than the master URL 14, thus freeing the master URL 14 for other clients.

This system 10 operates ideally with both unicast and multicast sections. The unicast section includes a proxy browser 30, a proxy server 28, a client server 32 (first client server), a keypad manager 34 and a control message 36 for the client group of user terminals 13. The unicast section transmits a portion of the data in the master URL 14 to the group of user terminals 13, as will be discussed later.

The multicast section includes the proxy browser 30, the proxy server 28, the client server 32, a multicast server 38, a multicast client server 40 (second client server), a multicast client storage location 41 with a browser cache 42, and a connection 43 to the group of user terminals 13. The multicast section transmits the entire contents of the master URL 14 to the group of user terminals 13, as will be discussed later.

As previously mentioned, the system 10 includes a proxy browser 30, which facilitates WWW searching. The proxy browser 30 functions as follows: the client initiates a browse command on the client server 32, which sends a command to the proxy browser 30 to load a particular URL (e.g. www.xyz.com), which subsequently sends a URL request (browse operation) 44 through the proxy server 28.

The proxy browser 30 conducts a first browse operation to request a portion of the data contained in the master URL 14. The proxy browser 30 then sends a unicast signal containing the portion of the master URL 14 through the client server 32 and to the keypad manager 34, which funnels control messages to the client terminal 13, as will be understood by one skilled in the art. The client terminal 13 then views the portion of the master URL 14 and decides whether to download the entire master URL 14. If the client affirmatively signals the proxy browser 30 to download the entire master URL 14, the multicast section activates and the proxy browser 30 downloads the data contained in the master URL to 14 the proxy server 28.

The proxy browser 30 contains logic operative to notify a multicast server 38 to load the data when the proxy server 28 contains all of the master URL data. In other words, the multicast server 38 loads the specified URL when the proxy server 28 has received and stored all of the URLs and data associated with the master URL 14 and when the client has received a command from the proxy browser 30 to load the master URL. The data transfer is ideally conducted through SERGE, which is a reliable information transfer system for multicast systems, as will be understood by one skilled in the art. The multicast server then sends the data to the multicast client storage location 41 through multicast channels 46, as will be understood by one skilled in the art. The browser cache 42, attached to the multicast client storage location 41, receives and stores the master URL data for access and use by the group of computer users 12.

As previously mentioned, the system 10 also includes a proxy server 28. The embodied proxy server 28 has an internal proxy server cache 29 in which it stores files for future requests from the proxy browser 30. The proxy server 28 contains logic operative to record the master URL data. The proxy server 28 also contains logic operative to signal the proxy server cache 29 when a portion of the master URL 14 is modified. When signaled, the proxy server 28 reloads the data contained in the master URL 14. The proxy server 28 also includes a distribution mechanism, which distributes the data to the client server 32.

Figure 3:
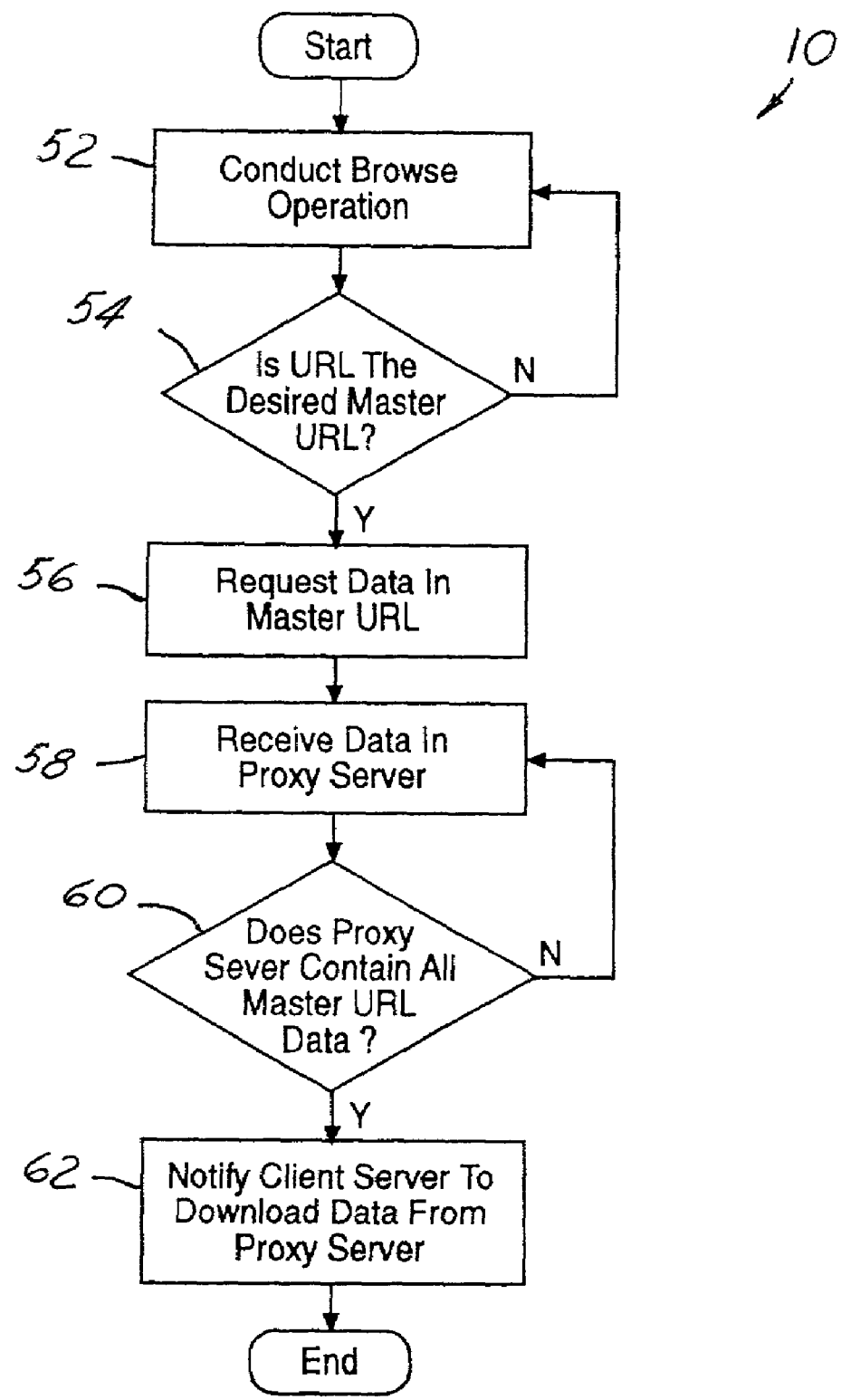
FIG. 3 is a block diagram of a server load reduction system in accordance with an embodiment of the present invention.

Referring to FIG. 3 in view of FIGS. 1 and 2, a block diagram of a server load reduction system 10, in accordance with one embodiment of the present invention, is illustrated. The logic starts in operation block 52 when the client conducts a browse operation (through the proxy browser 30) to find a master URL 14.

A determination is then made in inquiry block 54 whether the URL is the desired master URL. For a negative response, the logic flows again through operation block 52 until a positive response is obtained.

For a positive response, operation block 56 activates; and the proxy browser 30 requests the data stored in the master URL 14. Subsequently, operation block 58 activates, and the proxy server 28 receives the master URL data.

A determination is then made in inquiry block 60 whether the proxy server 28 contains all the master URL data. For a negative response, operation block 58 reactivates; and the proxy server 28 continues to receive master URL data.

Otherwise, operation block 62 activates, and the proxy browser 30 notifies the client server 32 to download the data from the proxy server.

In operation, in view of FIGS. 1,2 and 3, the client conducts a browse operation with the proxy browser 30 to load a desired master URL 14. When a potential master URL is found, the unicast portion of the system activates and a portion of the master URL 14 is stored in the proxy server 28. When the portion of the master URL 14 is completely stored in the proxy server 28, the proxy server 28 notifies the client server 32. The client is then free to view the portion of the master URL without requiring multicast operations.

When the client decides that the potential master URL is the desired master URL 14, the multicast portion of the system activates. Subsequently, the proxy browser 30 requests all the data contained in the master URL 14, and that data is received in the proxy server 28. The proxy server 28 then sends the data via multicast lines 48 to the multicast server 38 which stores the data and notifies the multicast client server 40 when the multicast server 38 contains all of the data in the master URL 14. The multicast client server 40 then receives the data through multicast signal lines 46 and stores the master URL data in a browser cache 42. The group of user terminals 13, associated with the client, then load portions of the master URL 14 as desired by the group of computer users 12.

It is to be understood that the multicast and unicast portions of the invention may function independently or jointly, as embodied, depending on the amount of information in the master URL 14. For small quantities of data, the unicast section sufficiently transfers the data to the group of user terminals 13. For larger quantities of data, the multicast section provides a greater number of open data transfer channels and therefore substantially increases data flow.

From the foregoing, it can be seen that there has been brought to the art a new and improved server load reduction system 10. It is to be understood that the preceding description of the preferred embodiment is merely illustrative of some of the many specific embodiments that represent applications of the principles of the present invention. Numerous and other arrangements would be evident to those skilled in the art without departing from the scope of the invention as defined by the following claims:

What is claimed is:

1. A server load reduction system for viewing data from a master URL comprising:
   a client group of computers comprising a plurality of browsers receiving the master URL to browse to only when the data representing a target page has been loaded to said client group of computers;
   a multicast server client storage location comprising a client browser cache and comprising logic automatically distributing the data to said client group of computers via multicast file distribution; and
   at least one client server for determining that a potential URL is the desired master URL and loading the master URL to said multicast server client storage location.

2. A server load reduction system according to claim 1 wherein at least two members of said client group of computers operate different web browser programs.

3. A server load reduction system according to claim 1 wherein the data is transferred to said client server from a proxy server through a SERGE transport system.

4. A server load reduction system according to claim 1 wherein said at least one client server comprises:
   a proxy server downloading said data;
   a first multicast server coupled to said client server and receiving said data from said client server and generating a signal indicative of all said data being transferred to said first multicast server; and
   a second multicast server coupled to said first multicast server and storing said data in said multicast server client storage location.

5. A server load reduction system according to claim 4 wherein said second multicast server loads said client group of computers with portions of said data as desired by said client group of computers.

6. A server load reduction system according to claim 4 further comprising a unicast associated client server coupled to said proxy server and transmitting unicast associated data to said client group of computers.

7. A method for reduction of server load comprising:
   conducting a browse operation with a proxy browser to find a master URL;
   requesting data contained in said master URL for use by a plurality of client computers;
   receiving said data in a client server;
   storing said data in a client browser cache;
   automatically loading said data to said plurality of client computers from said client browser cache;
   said plurality of client computers receiving said master URL to browse to only when all of said data is loaded to said plurality of client computers; and
   said plurality of client computers attempting to browse to said master URL, whereby said plurality of client computers load said data on monitors of said plurality of client computers.

8. A method according to claim 7 further comprising the step of updating said client browser cache to continuously maintain current said master URL data.

9. A method according to claim 7 further comprising:
   signaling a proxy server cache when a portion of said master URL is modified;
   reloading said master URL data; and
   distributing said master URL data to said client server.

10. A method for reduction of server load comprising:
    conducting a browse operation with a proxy browser to find a master URL;
    requesting a unicast portion of data contained in said master URL for use by a first client;
    receiving said unicast portion of said data in a proxy server;
    storing said unicast portion of said data in said proxy server;
    notifying a first client server when a proxy server contains all of said unicast portion of said data;
    determining that said master URL is a desired master URL;
    requesting a multicast portion of said data contained in said master URL for use by said first client;
    receiving said multicast portion of said data in said proxy server;
    notifying a multicast client server when said proxy server contains all of said multicast portion of said data;
    receiving said multicast portion of said data in said multicast server;
    automatically loading said multicast portion of said data from said multicast server to a plurality of client computers;
    said plurality of client computers receiving said master URL to browse to only when all of said data is loaded to said plurality of client computers; and
    said plurality of client computers attempting to browse to said master URL, whereby said plurality of client computers load said data on monitors of said plurality of client computers.

11. A method according to claim 10 wherein requesting said unicast portion of said data contained in said master URL further comprises requesting said unicast portion of said data contained in said master URL for use by a second client.

12. A method according to claim 11 wherein requesting said multicast portion of said data contained in said master URL further comprises requesting said multicast portion of said data contained in said master URL for use by said second client.

13. A method according to claim 11 further comprising downloading said multicast portion of said data to said first client server.

14. A method according to claim 11 wherein notifying said first client server when said proxy server contains all of said unicast portion of said data further comprises notifying said second client server when said proxy server contains all of said unicast portion of said data.

15. A method according to claim 11 further comprising downloading said multicast portion of said data to said second client server.

16. A method according to claim 10 further comprising the step of updating said proxy server to maintain current master URL data.

* * * * *